(12) United States Patent
Mizota

(10) Patent No.: US 7,998,297 B2
(45) Date of Patent: Aug. 16, 2011

(54) TIRE STRUCTURAL MEMBER FABRICATING METHOD AND APPARATUS FOR CARRYING OUT THE SAME

(75) Inventor: Yasuo Mizota, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1498 days.

(21) Appl. No.: 10/540,552

(22) PCT Filed: Dec. 24, 2003

(86) PCT No.: PCT/JP03/16574
§ 371 (c)(1),
(2), (4) Date: Aug. 2, 2005

(87) PCT Pub. No.: WO2004/062897
PCT Pub. Date: Jul. 29, 2004

(65) Prior Publication Data
US 2005/0269014 A1    Dec. 8, 2005

(30) Foreign Application Priority Data
Dec. 25, 2002    (JP) .................... 2002-373540

(51) Int. Cl.
*B29D 30/30*    (2006.01)
*B29D 30/70*    (2006.01)

(52) U.S. Cl. ........ 156/117; 152/526; 156/133; 156/397; 156/406.4

(58) Field of Classification Search .................. 156/117, 156/397, 133, 406.4, 130; 152/526, 562
See application file for complete search history.

(56) References Cited

U.S. PATENT DOCUMENTS

| | | | | |
|---|---|---|---|---|
| 6,461,459 B1 * | 10/2002 | Ogawa et al. | ............... | 156/117 |
| 6,702,913 B2 * | 3/2004 | Marchini et al. | ............... | 156/117 |
| 2002/0046796 A1 | 4/2002 | Hitotsuyanagi et al. | | |
| 2003/0024627 A1 * | 2/2003 | Ohkubo | ............... | 156/133 |

FOREIGN PATENT DOCUMENTS

| | | |
|---|---|---|
| EP | 1 279 485 A2 | 1/2003 |
| JP | 2001-088225 A | 4/2001 |
| WO | WO 01/38077 A1 | 5/2001 |

* cited by examiner

*Primary Examiner* — Geoffrey L Knable
(74) *Attorney, Agent, or Firm* — Sughrue Mion, PLLC

(57) ABSTRACT

A tire structural member fabricating method fabricates a tire structural member by successively and contiguously attaching strips 1 to the convex outer surface having an outwardly convex cross section of a forming drum 11 by a strip feed device 21 such that the strips 1 extend obliquely to the center axis C of the forming drum 11. The strip feed device 21 moves parallel to the center axis C of the forming drum 11 at a fixed speed V and feeds strips 1 successively onto the outer surface of the forming drum 11. A controller 40 controls the rotation of the forming drum 11 such that the angular velocity ω of the forming drum 11 varies gradually.

6 Claims, 4 Drawing Sheets

TIRE STRUCTURAL MEMBER FABRICATING METHOD AND APPARATUS FOR CARRYING OUT THE SAME

TECHNICAL FIELD

The present invention relates to a tire structural member fabricating method that attaches a plurality of strips successively to the outer surface of a forming drum such that the strips extend obliquely to the axis of the forming drum and to an apparatus for carrying out the tire structural member fabricating method.

BACKGROUND ART

Tire structural members fabricated by a tire structural member fabricating method of this kind include a belt member in the form of a cord-reinforced bias sheet. A belt fabricating method disclosed in JP 2001-88225 A forms a belt sheet on a cylindrical drum.

The belt sheet fabricating method disclosed in JP 2001-88225 A delivers strips successively onto a cylindrical drum rotating at a fixed angular velocity by moving a strip feed device at a fixed speed parallel to the axis of the cylindrical drum to attach the strips to the outer surface of the cylindrical drum obliquely to the axis of the cylindrical drum.

As shown in FIG. 8-1, a cylindrical belt structure 01 having a cylindrical shape is formed by thus successively attaching the strips to the cylindrical drum in a circumferential arrangement.

A convex cylindrical belt structure 02 having an outer surface of an outwardly convex cross section as shown in FIG. 8-2 is formed by shaping the cylindrical belt sheet 01. As shown in FIG. 8-2, stitchers 05 are pressed against end parts of the cylindrical belt sheet 01 so as to reduce the diameter of the end parts to form the convex cylindrical belt structure 02 of a shape conforming to the shape of the outer surface of a green tire.

The thus contracted end parts of the convex cylindrical belt structure 02 are creased and the thickness of the end parts varies along the circumference of the convex cylindrical belt structure 02.

The belt sheet fabricating method disclosed in JP 2001-88225 A attaches the strips to the cylindrical drum. If a convex cylindrical drum having a convex outer surface is used instead of the cylindrical drum, a convex cylindrical belt structure similar to the convex cylindrical belt structure 02 shown in FIG. 8-2 can be formed.

In a convex cylindrical drum having a curved outer surface of an outward convex cross section, the diameter of a middle part is greater than that of end parts. Therefore, when a predetermined number of strips are attached successively to the convex cylindrical drum such that middle parts of the strips are in properly adjoining disposition, end parts of the strips are overlapped.

When a predetermined number of strips are attached successively to the convex cylindrical drum such that end parts of the strips are in properly adjoining disposition, gaps are formed between adjacent middle parts of the strips. In either case, a tire structural member having a uniform quality cannot be formed.

The present invention has been made in view of such problems and it is therefore an object of the present invention to provide a tire structural member fabricating method capable of fabricating a tire structural member of a uniform quality by successively arranging a plurality of strips so that adjacent strips are in properly adjoining disposition, and to provide an apparatus for carrying out the method.

DISCLOSURE OF THE INVENTION

The present invention provides a tire structural member fabricating method, which fabricates a tire structural member by successively and contiguously attaching strips to a convex outer surface having an outwardly convex cross section of a forming drum by a strip feed device such that the strips extend obliquely to a center axis of the forming drum, the method comprising the steps of: continuously attaching strips to the convex outer surface of the forming drum by successively feeding strips onto the convex outer surface by the strip feed device, while the strip feed device is being moved parallel to the center axis of the forming drum relative to the forming drum at a fixed speed and while the forming drum is being rotated about the center axis thereof; and controlling the rotation of the forming drum such that the angular velocity of the forming drum varies gradually from a minimum angular velocity at a moment a leading end of the strip is attached to the convex outer surface of the forming drum to a maximum angular velocity at a moment the strip is attached to a middle part of the convex outer surface of the forming drum and from the maximum angular velocity to a minimum angular velocity at a moment a trailing end of the strip is attached to the convex outer surface of the forming drum, the minimum angular velocity at the moment the trailing end is attached being equal to the minimum angular velocity at the moment the leading end is attached.

Since the angular velocity of the forming drum is increased gradually from the minimum angular velocity at the moment the leading edge is attached to the convex outer surface of the forming roller to the maximum angular velocity at the moment a middle part of the strip is attached to the convex outer surface of the forming roller and from the maximum angular velocity to the minimum angular velocity at the moment the trailing end of the strip is attached to the convex outer surface of the forming drum when the strip feed device moving at the fixed speed relative to the forming drum along the center axis of the forming drum feeds strips successively, the inclination of the strip to the center axis of the forming drum increases gradually from one of the opposite ends of the forming drum toward the middle of the convex outer surface and decreases gradually from the middle part of the convex outer surface toward the other end of the forming drum.

Consequently, the width of the strip attached to the convex outer surface of the forming drum in a plane perpendicular to the center axis of the forming drum increases gradually from one of the opposite ends of the forming drum toward the middle of the convex outer surface and decreases gradually from the middle part of the convex outer surface toward the other end of the forming drum. Thus, a tire structural member having a fixed thickness can be fabricated by successively attaching the predetermined number of the strips to the convex outer surface of the forming drum such that adjacent strips are in proper adjoining disposition and any gap is not formed between middle parts of the adjacent strips. The tire structural member having a fixed thickness improves the quality of a tire.

In the tire structural member fabricating method according to the present invention, the step of controlling the rotation of the forming drum controls the rotation of the forming roller so that the forming drum rotates at angular velocity ω meeting relation expressed by:

$$\tan^{-1}\left(\frac{r\omega}{V}\right) = \cos^{-1}\left(\frac{nw}{2\pi r}\right)$$

where w is a width of the strips, n is the number of the strips, V is the fixed speed of the strip feed device, and r is the radius of the convex outer surface of the forming drum as a function of a distance along the center axis of the forming drum by which the strip feed device travels.

Since a middle part of the convex outer surface of the forming drum bulges outward, the radius r of the convex outer surface increases from the minimum radius at one of the opposite ends of the forming drum toward the maximum radius at the middle of the convex outer surface and decreases from the maximum radius to the minimum radius toward the other end. The inclination θ of the strip to the center axis of the forming drum is a function of axial distance; that is, the inclination θ increases from a minimum inclination at one of the opposite ends of the convex outer surface to a maximum inclination at the middle of the convex outer surface and decreases from the maximum inclination to the minimum inclination toward the other end.

Suppose that the strip is inclined at an inclination θ on a circle at an axial distance. Then, the length of the strip on the circle is w/cos θ. Therefore, n times the length is equal to 2πr, namely, the circumference of the convex outer surface. Therefore, n(w/cos θ)=2πr and cos θ=nw/2πr.

When the strip is attached at an inclination θ to the circle, the axial speed is V and the circumferential speed is rω. Therefore tan θ=rω/V. Therefore, $$\tan^{-1}\left(\frac{r\omega}{V}\right) = \cos^{-1}\left(\frac{nw}{2\pi r}\right)(=\theta)$$

When the forming drum is rotated at the angular velocity ω meeting the foregoing equation, the strips are attached to the enter convex outer surface of the forming drum such that the end parts of the strips do not overlap and any gap is formed between the middle parts of adjacent strips. Thus a tire structural member having a fixed thickness can be fabricated.

Typically, each of the strips may have opposite oblique ends inclined at an angle of $\cos^{-1}(nw/2\pi r_0)$, where $r_0$ is the radius of the opposite ends of the forming drum, to a direction in which the strip is fed.

Since the opposite ends of the strip are attached to the opposite ends of the forming drum, respectively, the strips can be attached in a smooth circular arc to the forming drum with opposite end parts of the strips properly arranged.

To carry out the tire structural member fabricating method of the present invention, the present invention provides a tire structural member fabricating apparatus comprising: a forming drum having a convex outer surface having an outwardly convex cross section and supported for rotation about a center axis thereof; a drum driving device for rotating the forming drum; a strip feed device for successively feeding strips and successively attaching the strips to the forming drum such that the strips are arranged successively and contiguously in a circumferential direction and are extended obliquely to the center axis of the forming drum; and a moving device for moving the strip feed device parallel to the center axis of the forming drum; wherein the moving device includes a strip feed device driving motor for moving the strip feed device at a fixed speed, the drum driving device includes a drum driving motor, a controller connected to the strip feed device driving motor and the drum driving motor, the controller controlling the strip feed device driving motor and the drum driving motor such that angular velocity of the forming drum varies gradually from a minimum angular velocity at a moment a leading end of the strip is attached to the convex outer surface of the forming drum to a maximum angular velocity at a moment the strip is attached to a middle part of the convex outer surface of the forming drum and from the maximum angular velocity to a minimum angular velocity at a moment a trailing end of the strip is attached to the convex outer surface of the forming drum, the minimum angular velocity at the moment the trailing end is attached being equal to the minimum angular velocity at the moment the leading end is attached.

In the tire structural member fabricating apparatus of the present invention, the controller controls rotation of the forming drum so that the forming drum rotates at angular velocity ω meeting relation expressed by:

$$\tan^{-1}\left(\frac{r\omega}{V}\right) = \cos^{-1}\left(\frac{nw}{2\pi r}\right)$$

where w is a width of the strips, n is the number of the strips, V is the fixed speed of the strip feed device and r is the radius of the convex outer surface of the forming drum as a function of distance along the center axis of the forming drum by which the strip feed device travels.

BEST MODE FOR CARRYING OUT THE INVENTION

Preferred embodiments of the present invention will be described with reference to FIGS. 1 to 7.

A tire structural member fabricating method in a preferred embodiment according to the present invention fabricates a belt sheet 3, namely, a tire structural member, by successively and contiguously attaching a plurality of strips 1 to the convex outer surface having a bulging middle part of a forming drum 11 so that the strips 1 extend obliquely to the center axis of the forming drum 11.

Figure 1:
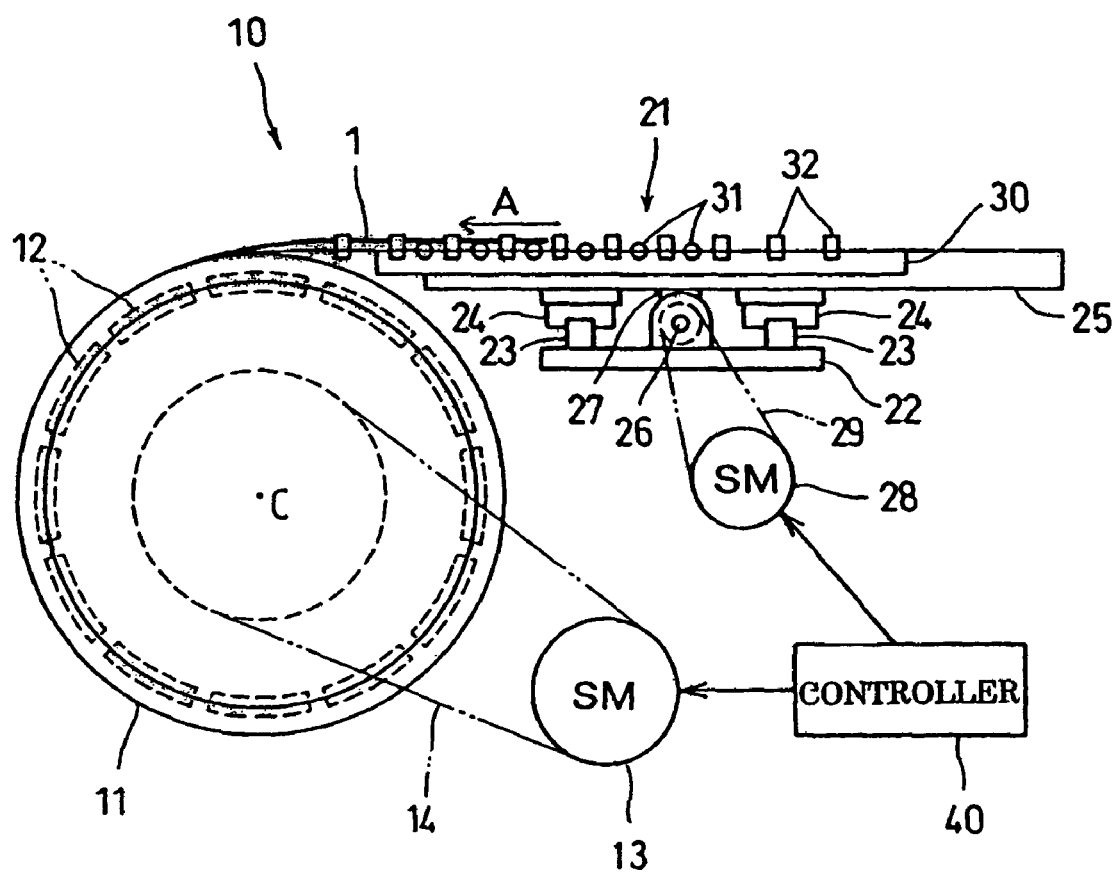
FIG. 1 is a schematic side elevation of a tire structural member fabricating apparatus in a preferred embodiment of the present invention.
Figure 2:
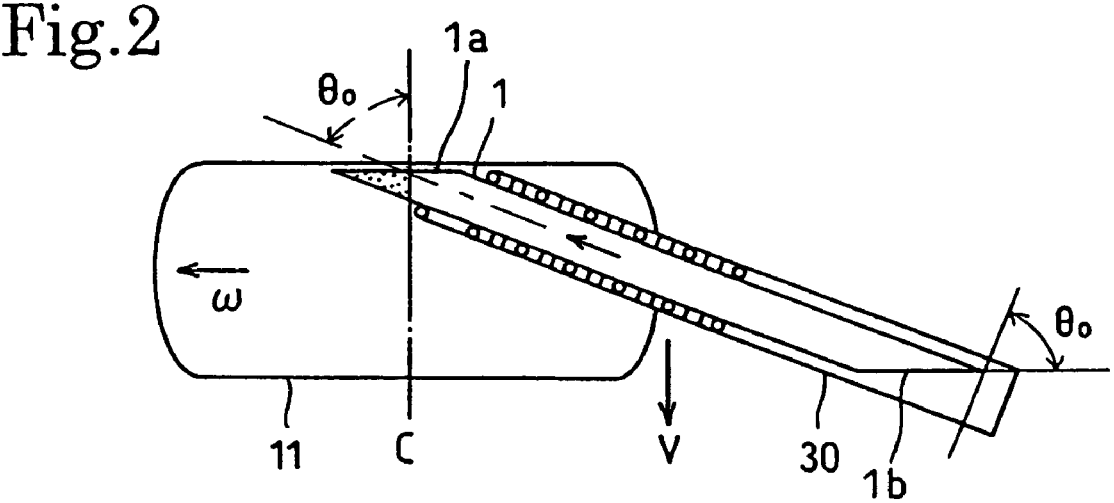
FIG. 2 is a top view of a part of the tire structural member fabricating apparatus shown in FIG. 1 at an initial stage of a strip attaching cycle.
Figure 3:
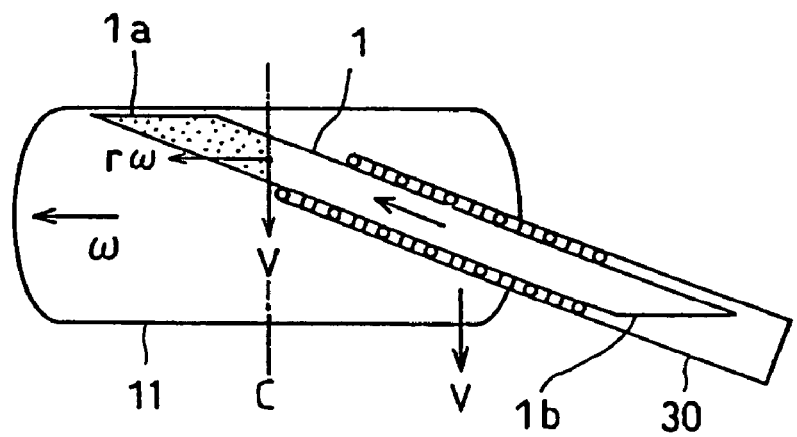
FIG. 3 is a top view of a part of the tire structural member fabricating apparatus shown in FIG. 1 at a middle stage of a strip attaching cycle.

FIGS. 1 to 3 show schematic views of a tire structural member fabricating apparatus 10 for carrying out the tire structural member fabricating method.

The forming drum 11 has a convex outer surface having an outwardly convex cross section. A peripheral surface of the forming drum 11 has thereon a plurality of electromagnets 12 arranged along the circumference of the forming drum 11. A servomotor 13 drives the forming cylinder 11 through a belt 14 to rotate the forming roller 11 about its center axis C.

A strip attaching device 21 is disposed obliquely above the forming drum 11 to attach strips 1 to the forming drum 11. A pair of rails 23 is extended parallel to the center axis C of the forming drum 11 on a base 22. A long sliding support plate 25 is supported on sliders 24 that slide along the rails 23. The sliding support plate 25 moves horizontally parallel to the center axis C along the rails 23. A threaded shaft 26 is engaged in a nut 27 attached to the sliding support plate 25. A servomotor 28 drives the threaded shaft 26 for rotation through a belt 29 to move the sliding support plate 25 parallel to the center axis C.

The sliding support plate 25 has its length in left-to-right direction as viewed in FIG. 1 and slopes down forward, i.e., toward the left as viewed in FIG. 1, so that the front end of the sliding support plate 25 is at a level lower than that of the back end of the same. The sliding support plate 25 is supported to be slidable parallel to the center axis C, while maintaining an attitude inclined at an angle $\theta_0$ (to be referred to later) to the center axis C of the forming drum 11.

A feed plate 30 is placed longitudinally on the sliding support plate 25. Carrier rollers 31 for carrying strips 1 in the direction of the arrow A are supported on the feed plate 30. Guide rollers 32 are arranged along the right and the left side of the feed plate 30.

The feed plate 30, similarly to the sliding support plate 25, is extended at the angle $\theta_0$ to the center axis C of the forming drum 11. The carrier rollers 31 and the guide rollers 32 are arranged on and along a path inclined at the angle $\theta_0$ to the center axis C.

Figure 5:
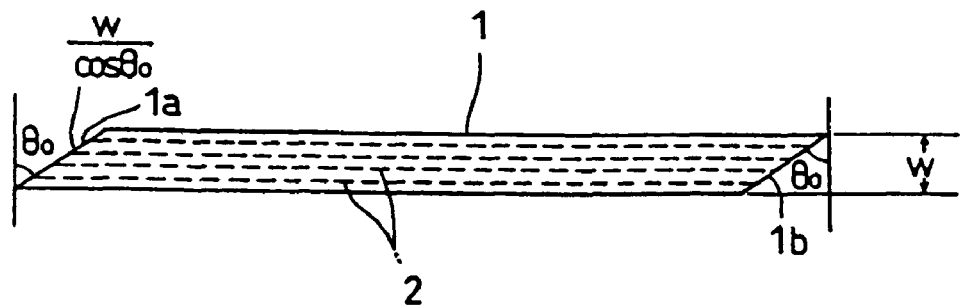
FIG. 5 is a plan view of a strip.

The strip 1 to be fed and attached to the forming drum 11 by the feed plate 30 is a member obtained by obliquely cutting a long belt of a width w formed by coating a plurality of steel cords 2 with rubber in a predetermined length, as shown in FIG. 5. The strip 1 has oblique ends inclined at the angle $\theta_0$ to its side edges.

The strips 1 delivered onto the carrier rollers 31 of the feed plate 30 are guided by the guide rollers 32 and are carried in the direction of the arrow A by the rotating carrier rollers 31. The strips 11 are fed successively from the front end (the left end as viewed in FIG. 1) of the feed plate 30 onto the top of the forming drum 11 so that their leading ends come into contact first with the forming drum 11 as shown in FIG. 2.

The electromagnet 12 attracts the leading end part of the strip 1 to the outer surface of the forming drum 11 to pull down the strip 1 from the feed table 30. As shown in FIG. 3, the sliding support plate 25 supporting the feed plate 30 moves parallel to the center axis C of the forming drum 11 while the strip 1 is pulled and the forming drum 11 rotates.

In a state where the leading end part of the strip 1 is attached to the forming drum 11, the strip 1 is fed to the forming drum 11 so that the longitudinal center axis thereof extends at the angle $\theta_0$ to the center axis C of the forming drum 11. Consequently, the strip 1 is attached to the outer surface of the forming drum 11 with the leading edge 1a thereof extending parallel to an end surface of the forming drum 11 as shown in FIG. 2, while the strip 1 is oriented at the angle $\theta_0$ to the center axis C.

The forming drum 11 is rotated at an angular velocity $\omega$ and the feed plate 30 is moved parallel to the center axis C of the forming drum 11 at a speed V. Consequently, the strips 1 successively fed by the feed plate 30 are attached obliquely to the outer surface of the forming drum 1 as shown in FIG. 3.

Figure 4:
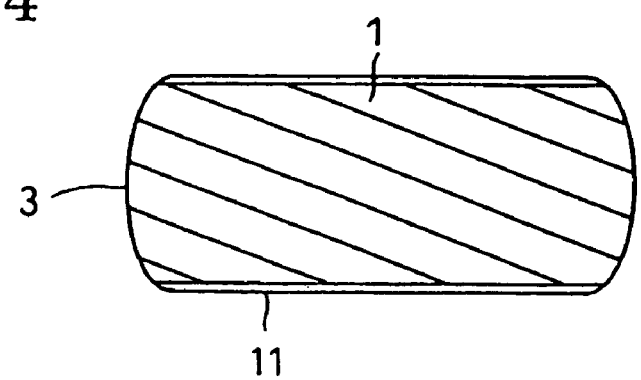
FIG. 4 is a top view of a tire structural member formed on a forming drum.

The foregoing strip attaching cycle is repeated to attach a predetermined number of the strips 1 contiguously to the outer surface of the forming drum 11 to form a tire structural member 3 having an outwardly convex cross section as shown in FIG. 4.

The tire structural member fabricating apparatus 10 of the present invention is provided with a controller 40. The controller 40 controls the two servomotors 13 and 28. The controller 40 controls the servomotor 28 so that the strip feed plate 30 is moved at the fixed speed V. The controller 40 controls the servomotor 13 so that the forming drum 11 is rotated at the variable angular velocity $\omega$ in the following manner.

The controller 40 controls the servomotor 13 such that the angular velocity $\omega$ of the forming drum 11 varies gradually from a minimum angular velocity at a moment the leading end 1a of the strip 1 is attached to the outer surface of the forming drum 11 to a maximum angular velocity at a moment the strip 1 is attached to a middle part of the outer surface of the forming drum 11 and from the maximum angular velocity to a minimum angular velocity at a moment the trailing end 1b of the strip 1 is attached to the outer surface of the forming drum 11. The minimum angular velocity at the moment the trailing end 1b of the strip 1 is attached is equal to the minimum angular velocity at the moment the leading end 1a is.

Figure 6:
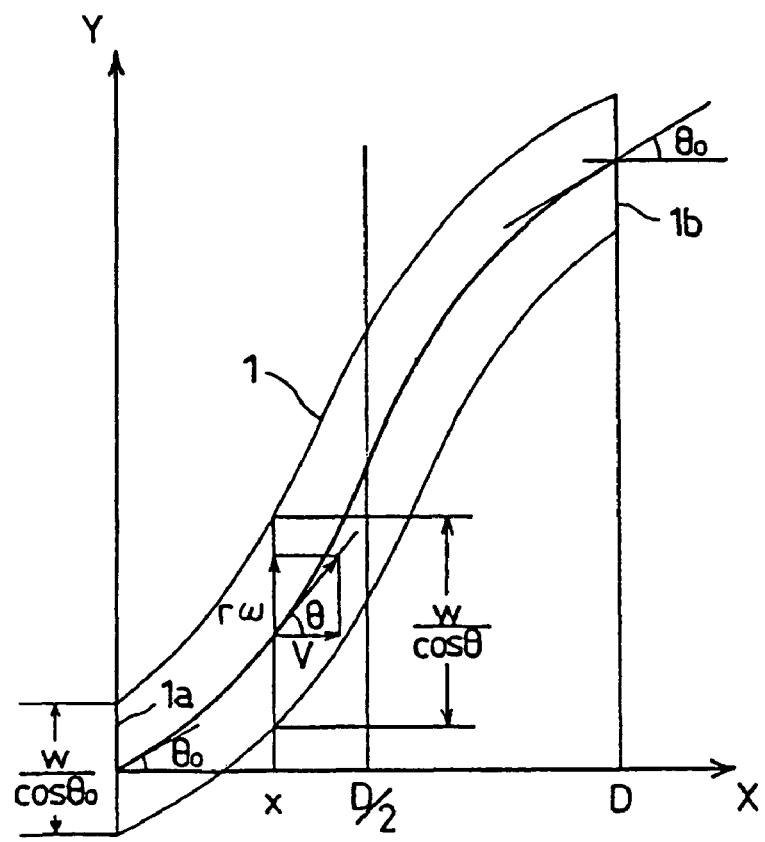
FIG. 6 is a development, on an X-Y coordinate system, of a strip attached to the forming drum.

The strip 1 attached to the outer surface of the forming drum 11 is deformed when the angular velocity $\omega$ of the forming drum 11 is varied as mentioned above. FIG. 6 is a development of the thus deformed strip 1 on a plane.

In FIG. 6, the leading end 1a of the deformed strip 1 is aligned with the Y-axis (X=0) and the middle of the leading end 1a is on the origin of the X-Y coordinate system.

The horizontal distance between the leading end 1a and the trailing end 1b of the strip 1 is D. The trailing end 1b extends along a line parallel with the Y-axis and crossing the X-axis at X=D, and X=D/2 is the abscissa of the center of the strip 1.

Suppose that a part of the outer surface of the forming drum 1 at a distance x (X=x) along the center axis C (X-axis) of the forming drum 11 from the leading end 1a of the strip 1 on the Y-axis (X=0) has a radius r and the forming drum 11 is rotating at an angular velocity $\omega$ at a moment the strip 1 is attached to the same part of the outer surface of the forming drum 11. Then, the speed dY/dt (t represents time) along the Y-axis of the strip 1 at X=x is equal to the circumferential speed r$\omega$ of the same part of the outer surface of the forming drum 11, and the speed dX/dt along the X-axis of the strip 1 at X=x is equal to the fixed speed V.

Therefore, the gradient dY/dX of the vector sum of the speeds dY/dt and dX/dt is r$\omega$/V. Therefore, $$\tan\theta = \frac{r\omega}{V} \quad (1)$$

The angle $\theta$ is the inclination of the strip 1 to the center axis C (X-axis) at a point X=x. Therefore, the length along the Y-axis at the point X=x is w/cos $\theta$.

The circumference of a circle on the outer surface of the forming drum 11 at X=x is 2$\pi$r. Therefore, n(w/cos $\omega$) is 2$\pi$r when n strips 1 are attached to the outer surface of the forming drum 11 so that the strips 1 are arranged in properly adjoining disposition without forming any gap between adjacent strips 1 at the point X=x. Therefore, the strips 1 are properly arranged when a condition expressed by Expression (2) is satisfied.

$$\cos\theta = \frac{nw}{2\pi r} \quad (2)$$

θ in Expression (1) and θ in Expression (2) are same. Therefore, from Expressions (1) and (2), $$\tan^{-1}\left(\frac{r\omega}{V}\right) = \cos^{-1}\left(\frac{nw}{2\pi r}\right) \quad (3)$$

A tire structural member of a fixed thickness can be formed by thus attaching the n strips 1 to the outer surface of the forming drum 11 in the range of 0≦X≦D so that the strips 1 are arranged in proper adjoining disposition without forming any gap between adjacent strips 1 when the angular velocity ω of the forming drum 11 is controlled so as to meet a condition expressed by Expression (3) when the strip 1 is being attached to a part at the point X=x of the outer surface of the forming drum 11.

The following equation is obtained by substituting Expressions (1) and (2) into an equation: $\tan^2\theta = 1/\cos^2\theta - 1$ $$\left(\frac{r\omega}{V}\right)^2 = \left(\frac{2\pi r}{nw}\right)^2 - 1$$

Expression (4) is obtained by rearranging this equation.

$$\omega = \left\{\left(\frac{2\pi r}{nw}\right)^2 - \left(\frac{1}{r}\right)^2\right\}^{1/2} \times V \quad (4)$$

A condition expressed by Expression (4) is the same as that expressed by Expression (3). Therefore, the angular velocity ω of the forming drum 11 may be controlled so as to meet the condition expressed by Expression (4).

Figure 7:
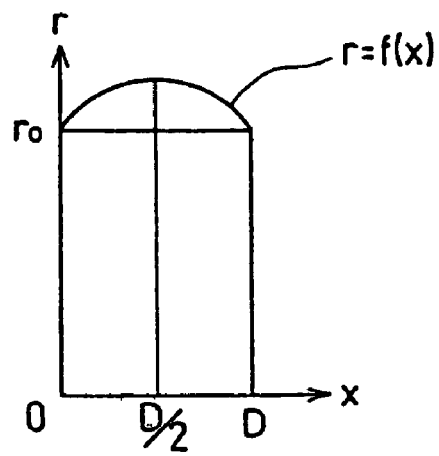
FIG. 7 is a diagrammatic view of the convex outer surface of the forming drum on an orthogonal coordinate system.
Figures 1, 8:
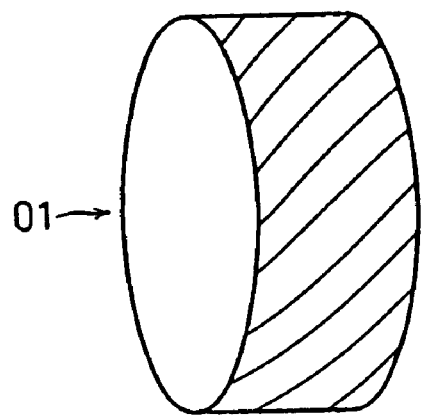
FIG. 8 is a perspective view explaining a conventional ply sheet fabricating method.
Figures 2, 8:
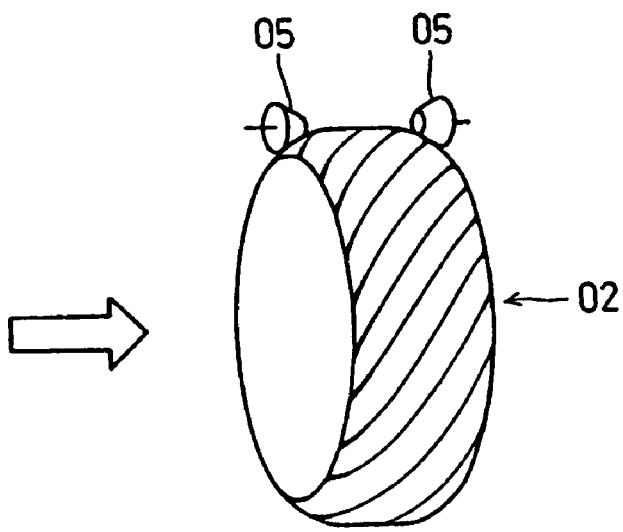

FIG. 7 is a graph showing a cross section of the outer surface of the forming drum 11 on an orthogonal coordinate system.

In FIG. 7, distance x along the center axis C of the forming drum is measured on the horizontal axis and radius r of the outer surface of the forming drum 11 is measured on the vertical axis. The radius r is a function of x, namely, r=f(x).

Suppose that the radius of the opposite ends respectively at x=0 and x=D of the forming drum 11 to which the strip 1 is attached is $r_0$. Then, $f(0)=f(D)=r_0$. The radius of a circle on the outer surface of the forming drum 11 at x=D/2 is a maximum radius f(D/2).

The feed plate 30 move in a direction parallel to the X-axis at the fixed speed V. Therefore, the feed plate 30 that started attaching a strip 1 to a part at x=0 of the forming drum 11 at t=0 attaches the strip 1 to a part at x=Vt at t=t.

Therefore, the radius r of the outer surface of the forming drum 11 can be expressed by: r=f(Vt), namely, a function of time.

Expression (5) is obtained by substituting r=f(Vt) into Expression (4).

$$\omega = \left\{\left(\frac{2\pi r}{nw}\right)^2 - \left(\frac{1}{f(Vt)}\right)^2\right\}^{1/2} \times V \quad (5)$$

Thus, the angular velocity ω can be expressed by a function of time t.

The controller 40 controls the servomotor 13 to rotate the forming drum 11 at the angular velocity ω calculated by using Expression (5). Consequently, the n strips 1 can be successively attached to the outer surface of the forming drum 11 in a proper arrangement to form a high-quality tire structural member of a fixed thickness.

Suppose that the opposite ends at X=0 and X=D of the forming drum 11 have a radius $r_0$. Then, it is known from Expression (2) that the strips 1 can be attached to the forming drum 11 so that the opposite ends of the strips 1 are properly arranged on the opposite ends of the forming drum 11 when the leading end 1a and the trailing end 1b of each strip 1 are cut so as to slope at an angle meeting an equation: $\cos\theta_0 = nw/2\pi r_0$ to the side edge of the strip 1.

The invention claimed is:

1. A tire structural member fabricating method, which fabricates a tire structural member by successively and contiguously attaching strips to a convex outer surface having an outwardly convex cross section of a forming drum by a strip feed device such that the strips extend obliquely to a center axis of the forming drum, said method comprising the steps of:

continuously attaching strips to the convex outer surface of the forming drum by successively feeding strips onto the convex outer surface by the strip feed device, while the strip feed device is being moved parallel to the center axis of the forming drum relative to the forming drum at a fixed speed from an axial end of the forming drum to another end thereof and while the forming drum is being rotated about the center axis thereof; and controlling the rotation of the forming drum such that the angular velocity of the forming drum varies gradually and continuously from a minimum angular velocity at a moment a leading end of the strip is attached to the convex outer surface of the forming drum to a maximum angular velocity at a moment the strip is attached to a middle part of the convex outer surface of the forming drum and from the maximum angular velocity to a minimum angular velocity at a moment a trailing end of the strip is attached to the convex outer surface of the forming drum, the minimum angular velocity at the moment the trailing end is attached being equal to the minimum angular velocity at the moment the leading end is attached.

2. The tire structural member fabricating method according to claim 1, wherein the step of controlling the rotation of the forming drum controls the rotation of the forming roller so that the forming drum rotates at angular velocity ω meeting relation expressed by:

$$\tan^{-1}\left(\frac{r\omega}{V}\right) = \cos^{-1}\left(\frac{nw}{2\pi r}\right)$$

where w is a width of the strips, n is the number of the strips, V is the fixed speed of the strip feed device, and r is the radius of the convex outer surface of the forming drum as a function of a distance along the center axis of the forming drum by which the strip feed device travels.

3. The tire structural member fabricating method according to claim 2, wherein each of the strips is given opposite oblique ends inclined at an angle of $\cos^{-1}(nw/2\pi r_0)$ to a direction in which the strip is fed, where $r_0$ is the radius of the opposite ends of the forming drum.

4. The tire structural member fabricating method according to claim 1, wherein each of the strips is given opposite oblique ends inclined at an angle of $\cos^{-1}(nw/2\pi r_0)$ to a direction in which the strip is fed, where $r_0$ is the radius of the opposite ends of the forming drum, where w is a width of the strips and n is the number of the strips.

5. A tire structural member fabricating apparatus comprising:
   a forming drum having a convex outer surface having an outwardly convex cross section and supported for rotation about a center axis thereof;
   a drum driving device for rotating the forming drum;
   a strip feed device for moving from an axial end of the forming drum to another end thereof and for successively feeding strips and successively attaching the strips to the forming drum such that the strips are arranged successively and contiguously in a circumferential direction and are extended obliquely to the center axis of the forming drum; and
   a moving device for moving the strip feed device relative to the forming drum parallel to the center axis of the forming drum;
   wherein the moving device includes a strip feed device driving motor for moving the strip feed device at a fixed speed,
   the drum driving device includes a drum driving motor, and
   a controller connected to the strip feed device driving motor and the drum driving motor, the controller is controlling the strip feed device driving motor and the drum driving motor such that angular velocity of the forming drum varies gradually and continuously from a minimum angular velocity at a moment a leading end of the strip is attached to the convex outer surface of the forming drum to a maximum angular velocity at a moment the strip is attached to a middle part of the convex outer surface of the forming drum and from the maximum angular velocity to a minimum angular velocity at a moment a trailing end of the strip is attached to the convex outer surface of the forming drum, the minimum angular velocity at the moment the trailing end is attached being equal to the minimum angular velocity at the moment the leading end is attached.

6. The tire structural member fabricating apparatus according to claim 5, wherein the controller controls rotation of the forming drum so that the forming drum rotates at angular velocity $\omega$ meeting relation expressed by:

$$\tan^{-1}\left(\frac{r\omega}{V}\right) = \cos^{-1}\left(\frac{nw}{2\pi r}\right)$$

where w is a width of the strips, n is the number of the strips, V is the fixed speed of the strip feed device and r is the radius of the convex outer surface of the forming drum as a function of distance along the center axis of the forming drum by which the strip feed device travels.

* * * * *